Patented May 9, 1939

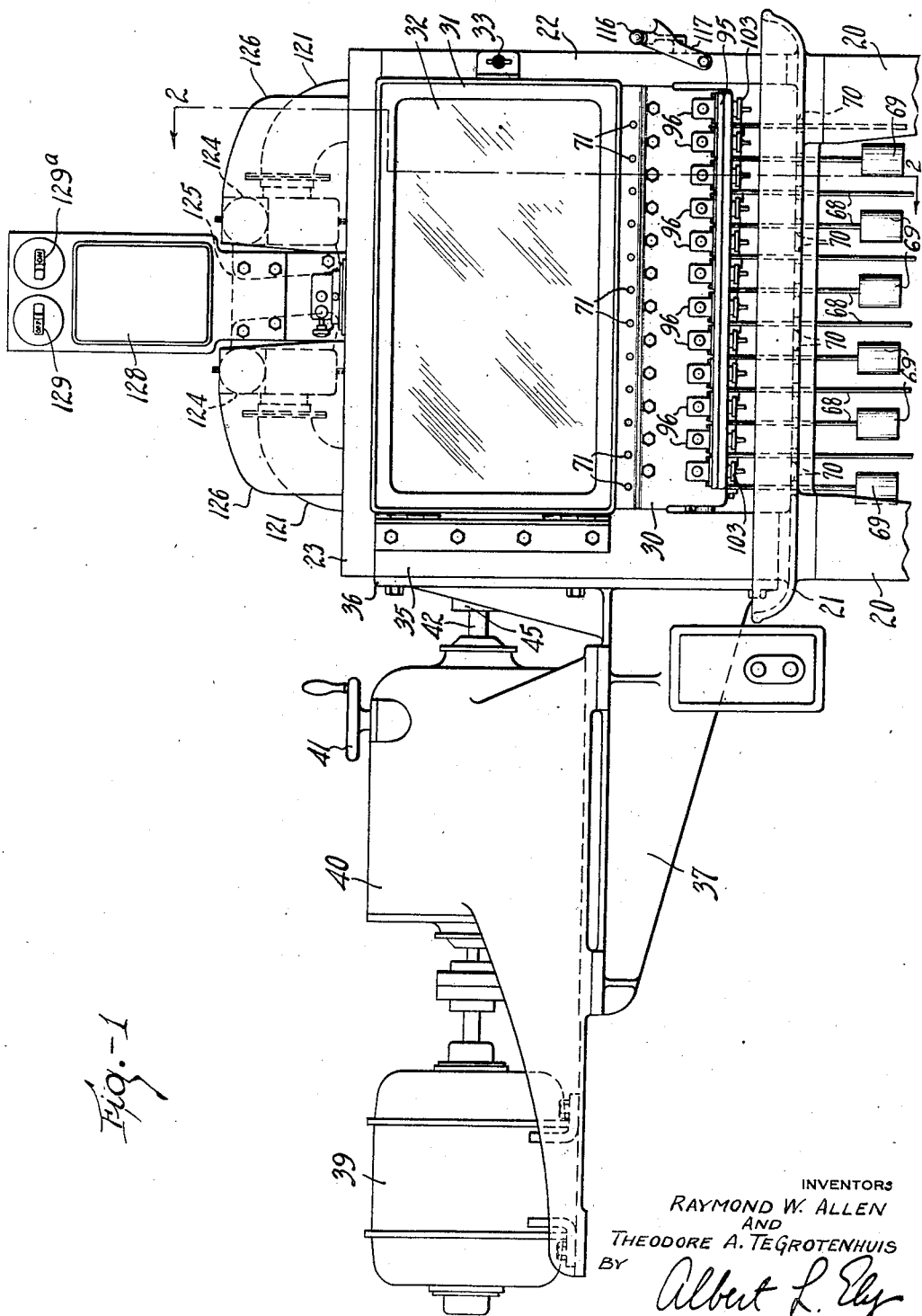

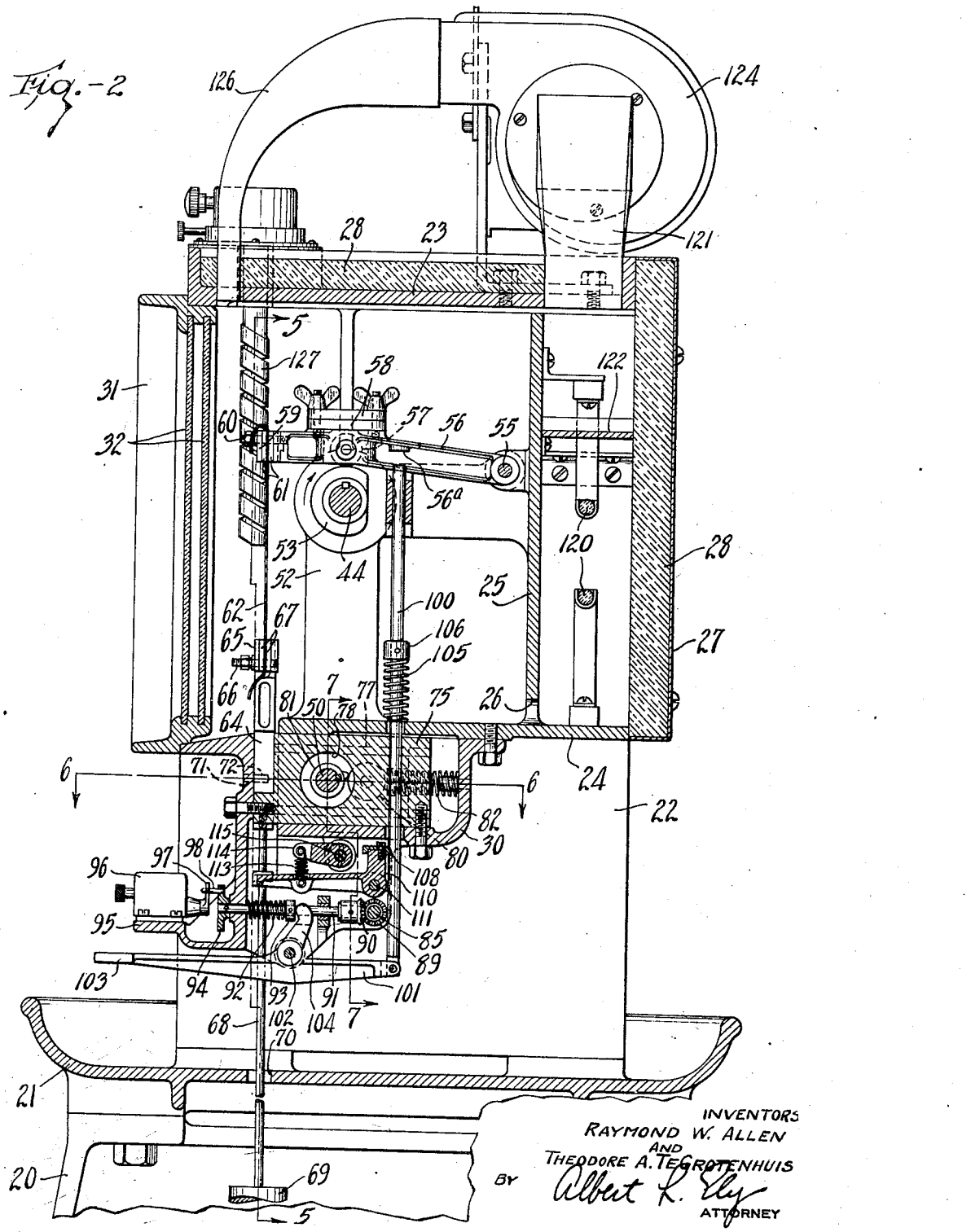

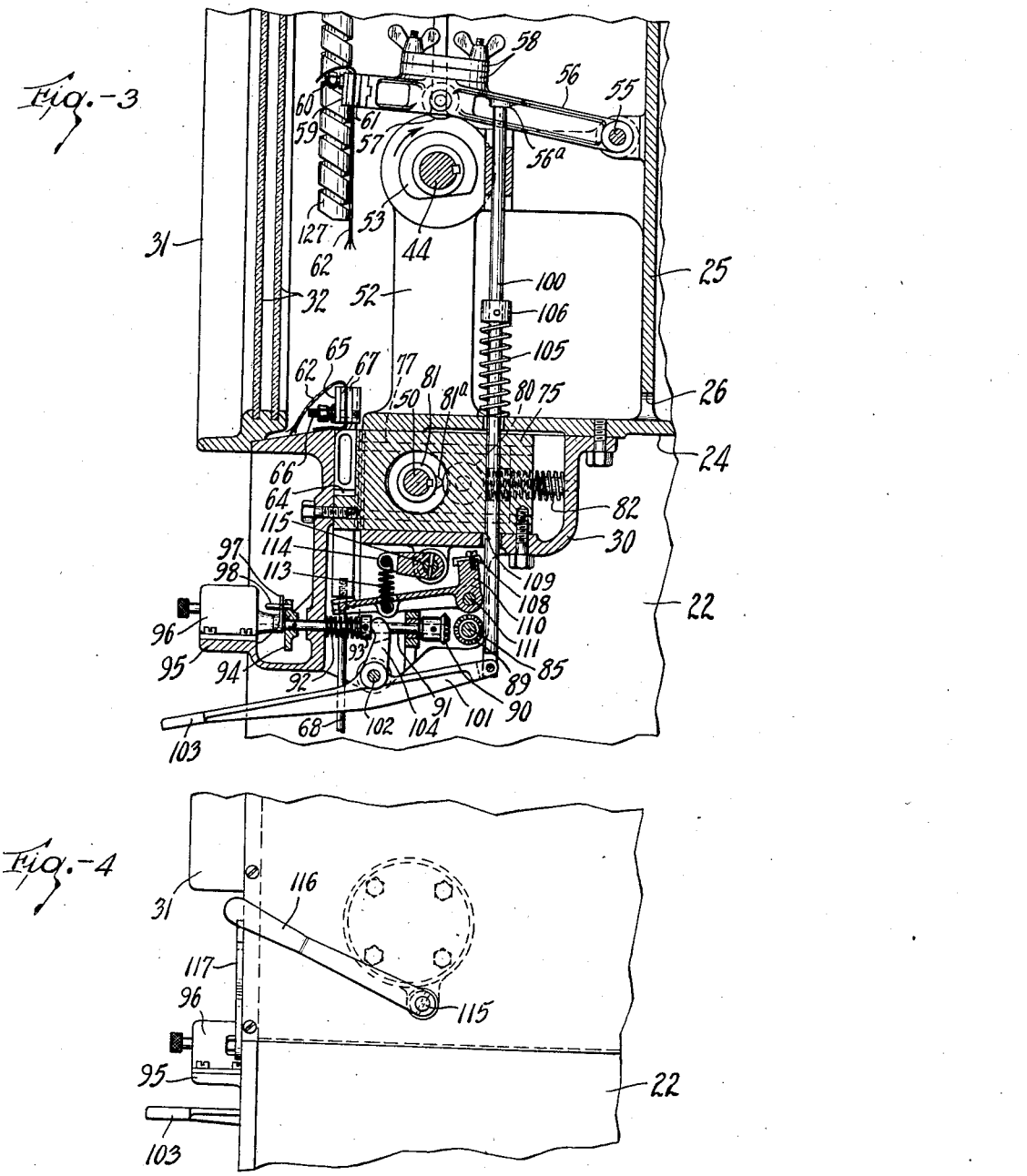

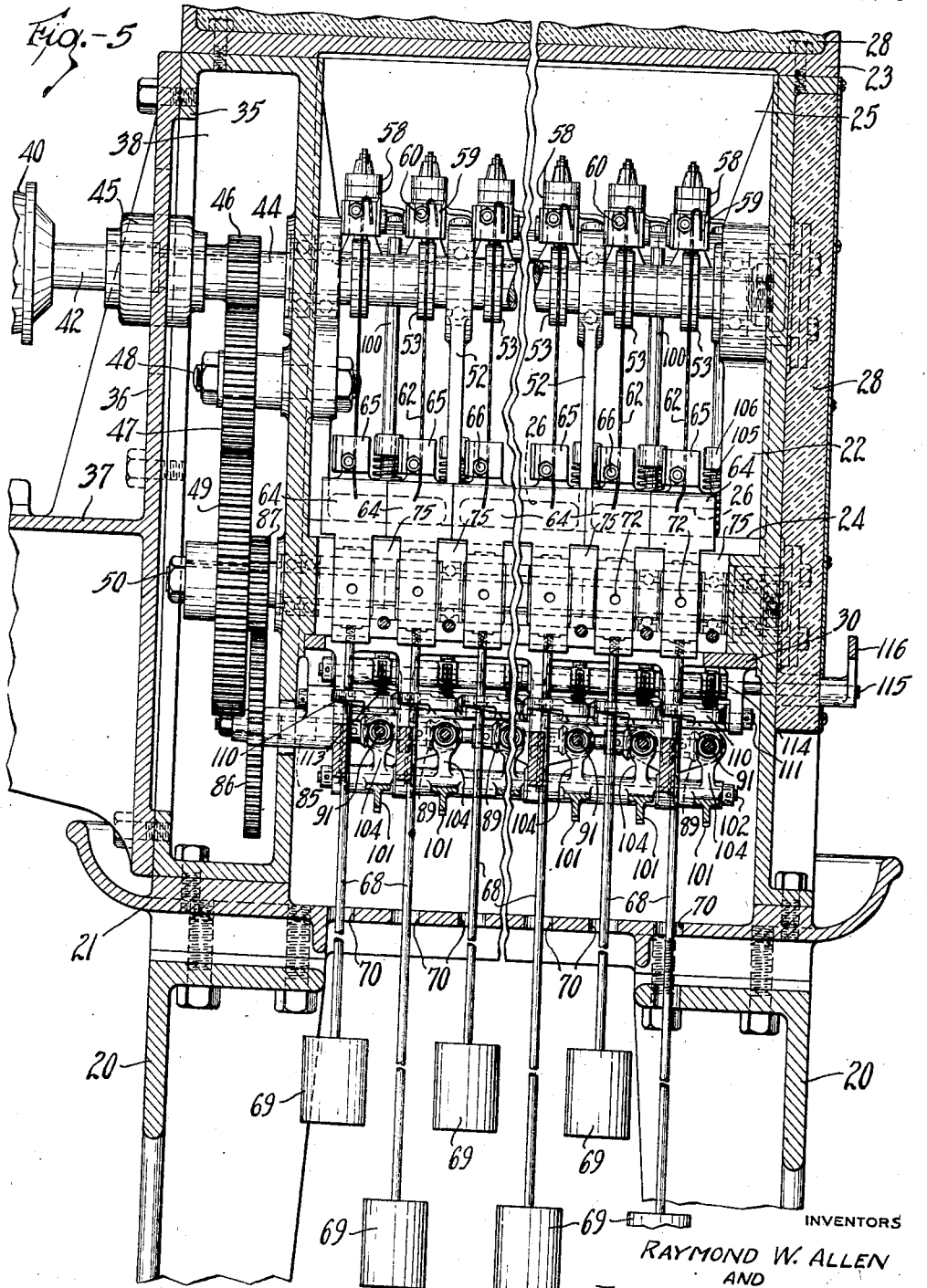

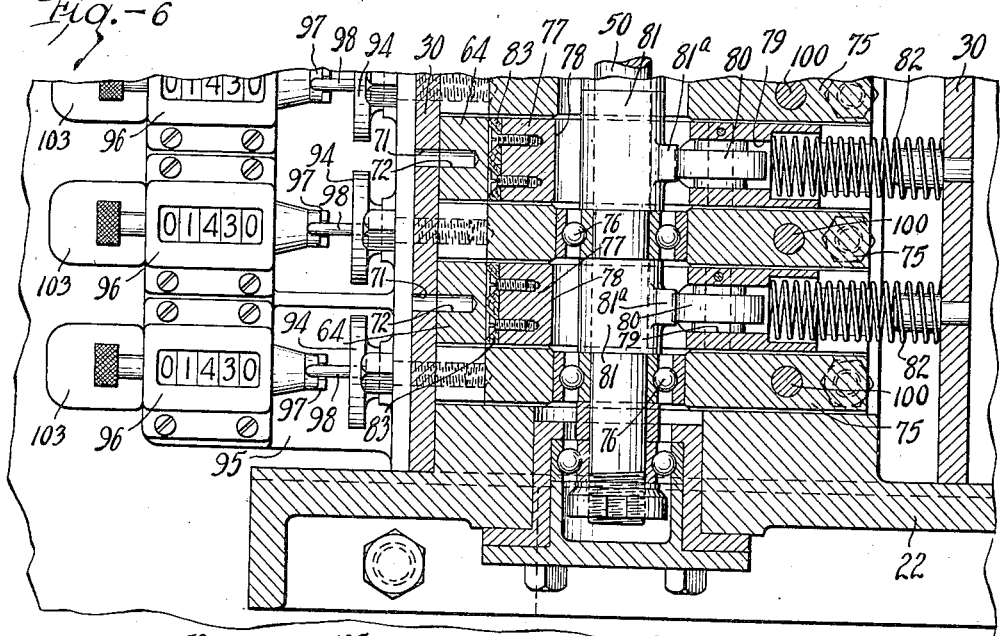
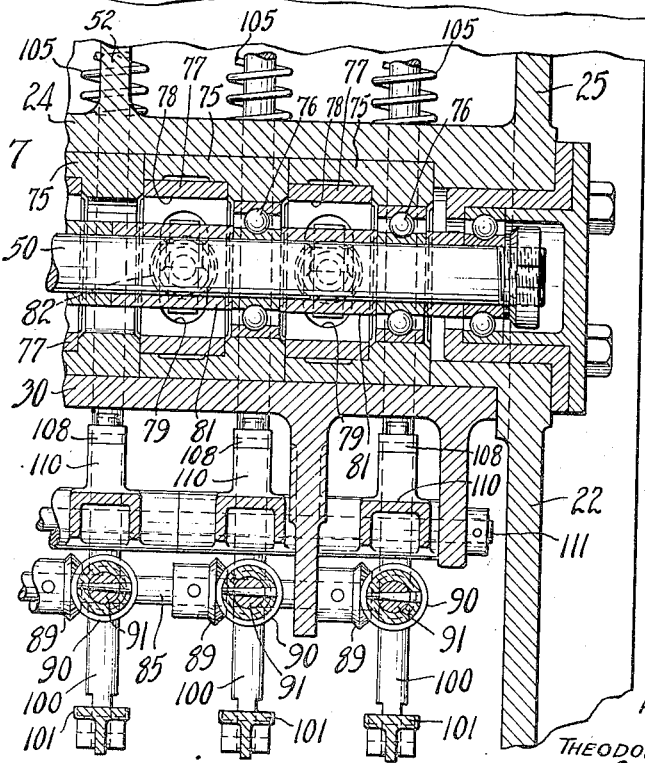

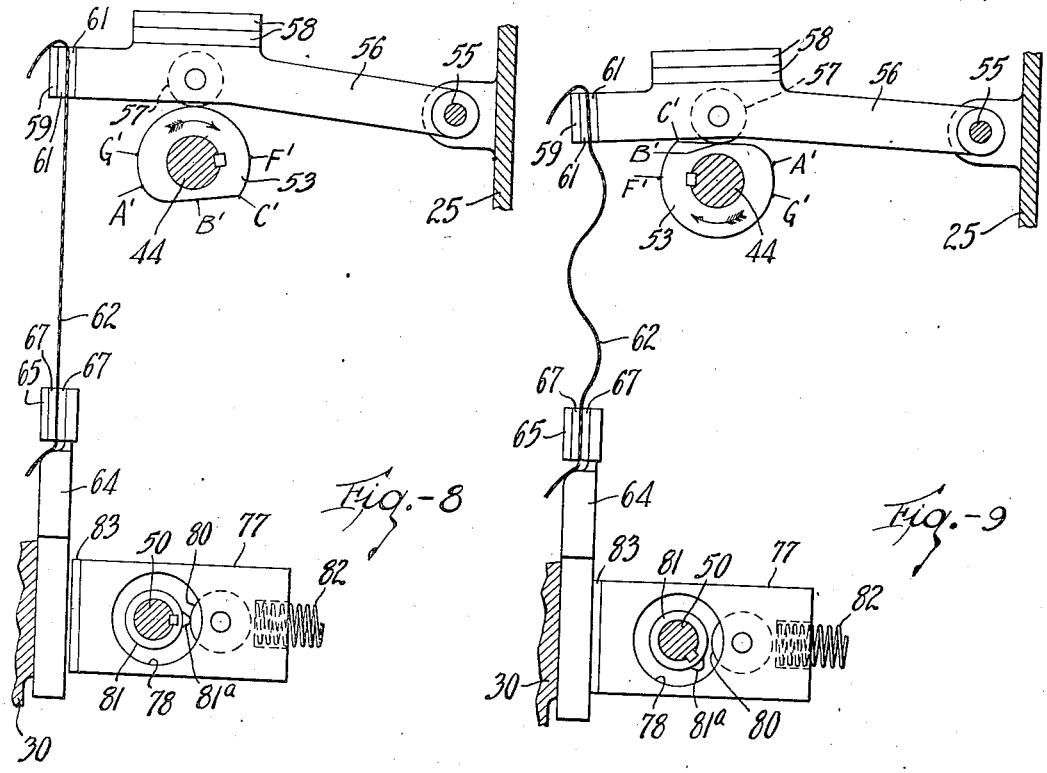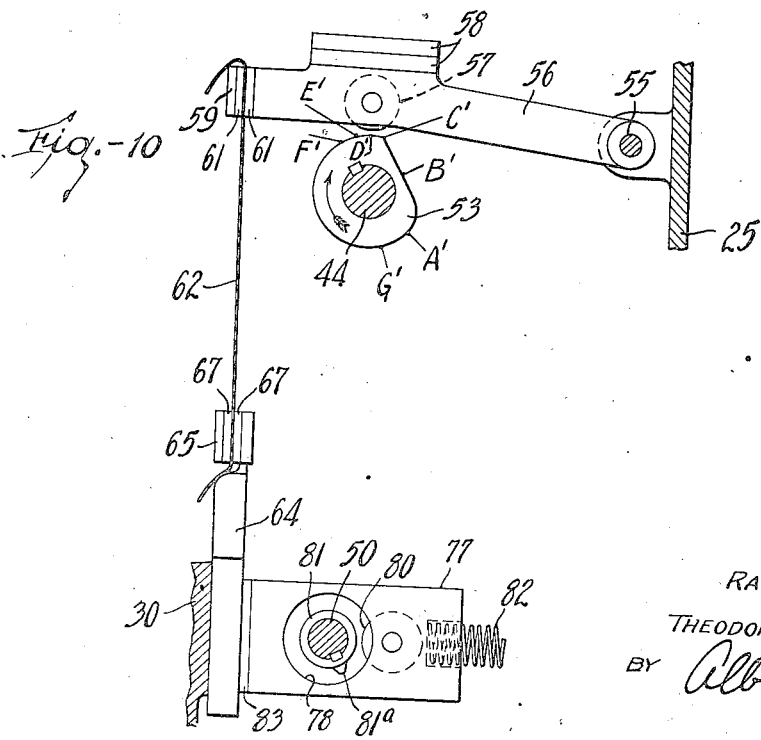

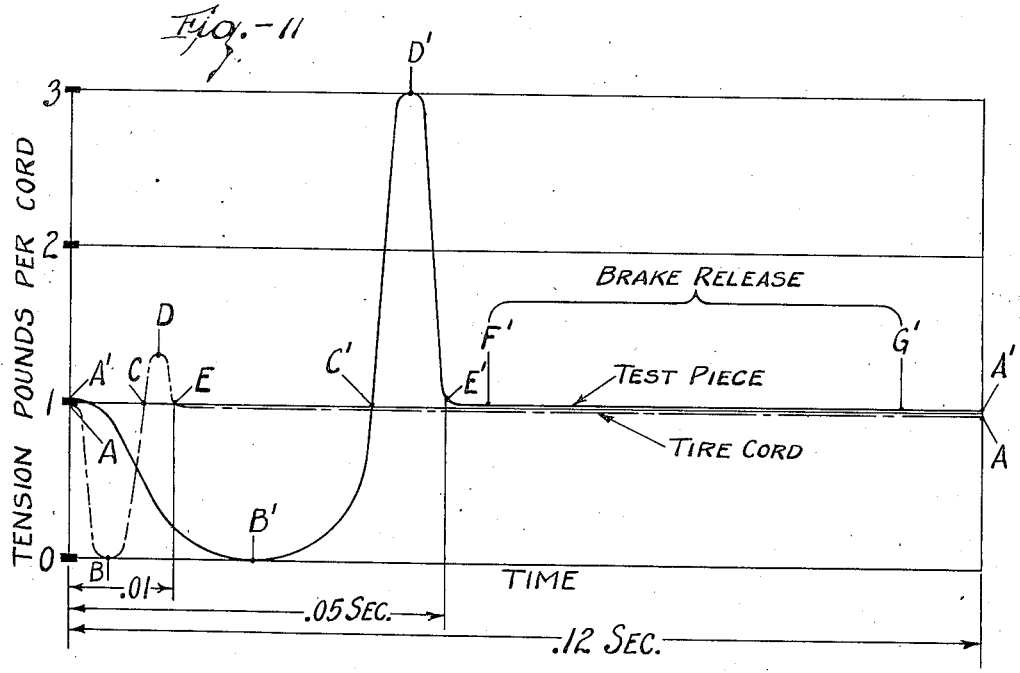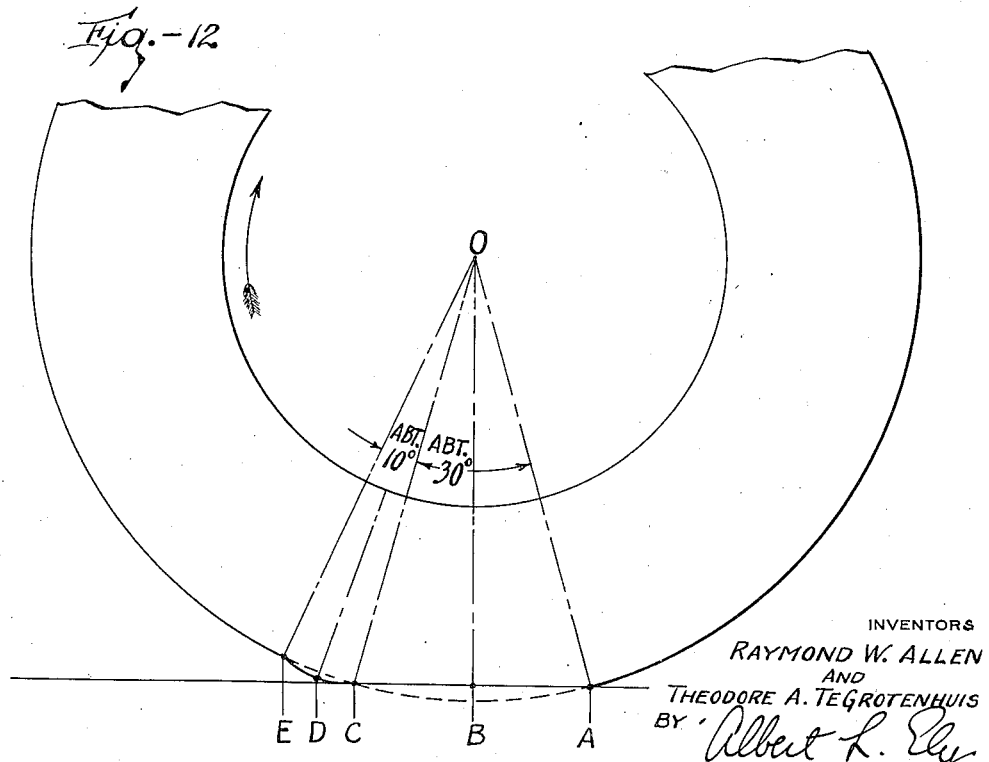

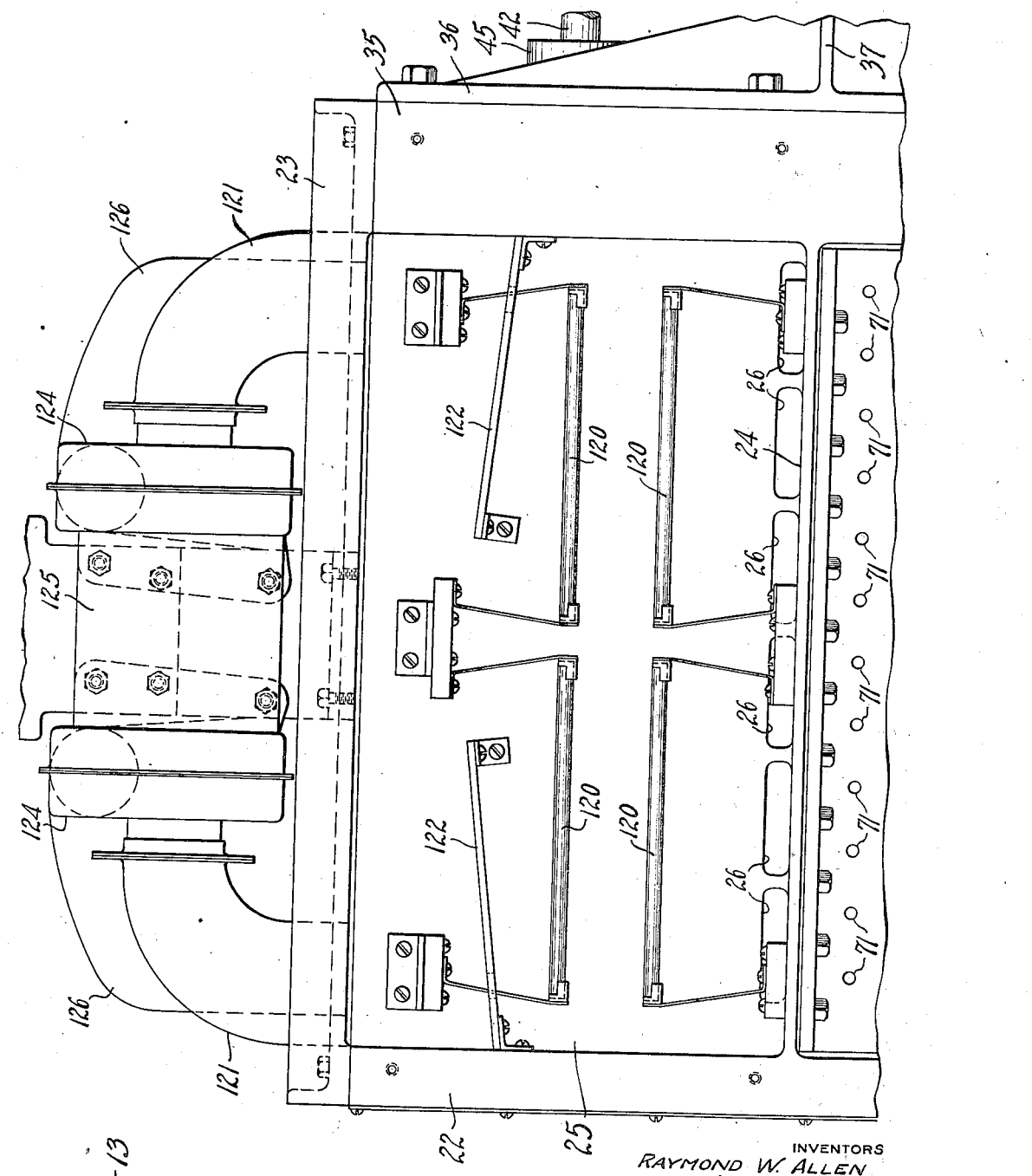

2,157,092

UNITED STATES PATENT OFFICE 2,157,092

FABRIC TESTING APPARATUS

Raymond W. Allen and Theodore A. Te Grotenhuis, Akron, Ohio, assignors to The Firestone Tire & Rubber Company, Akron, Ohio, a corporation of Ohio Application June 24, 1936, Serial No. 86,980

14 Claims. (Cl. 73—51)

This invention relates to fabric testing apparatus, and more especially it relates to apparatus for determining the relative strength of the individual strands of which the fabric is composed.

The apparatus is of especial utility for testing the strands or cords of weftless or weak-wefted cord fabric such as is used in the manufacture of pneumatic tire casings. In order to obtain reliable data bearing on the practicability of various cord constructions for use in pneumatic tires, it is essential that the testing thereof should simulate, as closely as possible, the various conditions that obtain in the fabric carcass of a tire when the latter is in actual use. Experience has shown that the greatest tensile strain on the fabric cords of a pneumatic tire in use occurs immediately after the cord has been flexed by the flattening of the tire by contact with the roadway, the recovery after such flexure being in the nature of a snapping action that slightly elongates the cords beyond the elongation resulting from the normal internal pressure of the tire.

The chief object of this invention is to provide apparatus for subjecting cord fabric strands periodically to tensile strains in simulation of the strains imposed upon such strands in use in a tire. More specifically, the invention aims to provide such an apparatus wherein the temperature automatically is maintained at a determinate degree; to provide for gripping the respective end portions of the cord strands in such a manner as not to crush or weaken them at these points; to provide automatically and periodically to take up slack in the strands being tested; and to provide for accentuating the snap phase of the testing cycle so that the results of a relatively brief test in the apparatus are comparable to the results of a relatively long period of use in a tire. Other objects will be manifest.

Of the accompanying drawings:

Figure 1 is a front elevation of apparatus embodying the invention, in its preferred form;

Figure 2 is a section on the line 2—2 of Figure 1, the apparatus being shown in operative position;

Figure 3 is a view of the work-engaging elements shown in Figure 2 in the positions they assume after a strand has failed under test;

Figure 4 is a fragmentary end elevation of the apparatus showing a lever for manually throwing the mechanism of the apparatus to inoperative position;

Figure 5 is a section on the line 5—5 of Figure 2;

Figure 6 is a section on the line 6—6 of Figure 2;

Figure 7 is a section on the line 7—7 of Figure 2;

Figure 8 is a somewhat diagrammatic view showing the work-holding elements of the apparatus in the position they assume during the taking up of the slack in the strand being tested;

Figure 9 is a view of the elements shown in Figure 8 as they appear during the work-flexing phase of the testing cycle;

Figure 10 is a view of the elements shown in Figure 8 as they appear during the snap phase of the testing cycle;

Figure 11 is a graph showing how the strains imposed upon cord strands in the testing apparatus compare with the strains imposed upon similar cord strands in a tire in use;

Figure 12 is a fragmentary, diagrammatic view of a pneumatic tire showing deformation thereof in the region that is in contact with the roadway, and in the region immediately behind the latter region; and Figure 13 is a rear elevation of the upper portion of the apparatus, with cover removed, showing the elements that provide heat for the apparatus.

Referring to the drawings, the improved testing apparatus comprises a pair of legs or standards 20, 20 that support a rectangular metal pan 21 having upturned marginal portions as shown. Mounted upon said pan is a main frame 22 that constitutes the opposite ends of a housing structure and mounted atop of said main frame is the top cover 23 of said housing. The main frame 22 comprises horizontal partition 24 that is disposed about midway between its top and bottom, which partition constitutes the floor of the housing. The front margin of the partition 24 is disposed somewhat rearwardly of the front of the main frame. Rising from the partition 24 and extending from end to end of the main frame is a vertical partition 25 that is disposed relatively near the rear of said main frame, and there are a plurality of slots 26, 26 in said partition 25 along the bottom thereof where it adjoins partition 24. The housing is provided with a rear cover 27 that extends from partition 24 to the top cover 23, said rear cover being removably secured in place by screws or other suitable means. The top cover 23, and rear cover 27 preferably are covered with or composed of heat insulating material 28, as shown in Figure 2, and one end of the main frame 22 (the right end as viewed from the front thereof) may be similarly covered with the material 28, from the top plate to a point a little below partition 24, as is clearly shown in Figure 5.

Secured to the bottom face of horizontal partition 24 is a counter frame 30 that extends from end to end of the main frame, and at its front extends beyond the front margin of said partition 24 as far as the front of the main frame. Fitting into the rectangular space defined by the front margins of the opposite ends of main frame 22, and front margins of top cover 23 and counter frame 30, is a door 31 that has two panes of glass 32, 32 mounted in parallel, spaced relation therein, said door constituting the front of the housing, and the double panes of glass being provided to prevent loss of heat therethrough. The door 31 is hinged at one end to the main frame and at its other end is provided with a latch 33 for holding it closed.

At the left hand end of the apparatus, as viewed from the front thereof, the main frame 22 is formed with a flange 35 that extends laterally of the end wall of said frame, on the four margins thereof, and secured to said flange is an end plate 36 that is integrally formed with a laterally extending bracket 37. The arrangement is such as to provide a chamber or space 38, Figure 5, between the end plate 36 and adjacent end wall of the main frame, which space constitutes a gear case. Mounted upon the bracket 37 is a power unit consisting of a motor 39 that is coupled to a variable speed device 40, the latter being manually controllable by means of a handwheel 41 at the top thereof, whereby the rotative speed of the driving shaft 42 of the device may be selectively controlled.

Interiorly of the housing is a horizontal cam shaft 44 that is journaled in suitable bearings in the opposite end walls of the main frame 22, one end of said cam shaft extending through the gear case chamber 38 and end plate 36, and being coupled, by means of coupling 45, to the driving shaft 42. Mounted upon cam shaft 44, within gear case 38, is a pinion 46 that is meshed with an idler gear 47 that is journaled on a stub shaft 48 projecting from the end wall of main frame 22. The idler gear 47 is meshed with a gear 49 that is mounted upon the end of a second cam shaft 50 that is journaled in the opposite end walls of said main frame 22 below and parallel to the cam shaft 44. The ratio between pinion 46 and gear 49 is such that cam shaft 44 rotates four times as fast as cam shaft 50.

Formed integral with the horizontal partition 24 and vertical partition 25 are a plurality of webs 52, 52 that are formed with journal bearings for supporting the upper cam shaft 44 intermediate journals on the end walls of the main frame. The number of webs 52 employed is exactly half the number of cord-testing units in the apparatus. In practice it has been found that twelve testing units is a convenient number to employ in a single apparatus. Keyed to the cam shaft 44 are a plurality of cams 53, 53 of which there is one for each testing unit, there being two cams disposed between adjacent webs 52, and between the latter and each end wall of the main frame.

Mounted in the end walls of main frame 22 and the webs 52 through which it passes is a rod or shaft 55 that is positioned adjacent vertical partition 25 and is parallel to cam shaft 44. Journaled upon shaft 55 and extending forwardly therefrom over said cam shaft, in alignment with the cams 53 thereon, are respective rocker arms 56, each of which carries a roller 57 that rests upon a cam, the arrangement being such that rotation of cam shaft 44 raises and lowers the rocker arms in unison. Each rocker arm 56 has one or more weights 58 removably secured thereto. The free end of each rocker arm is provided with work-gripping means that comprises a clamping plate 59 that is secured to the arm by means of a stud and nut 60. The adjacent faces of rocker arm and clamping plate constitute gripping jaws and are covered with soft rubber composition, as shown at 61, 61, so as not to bruise or crush the fibres of the test piece clamped therebetween, and the stud and nut engage the clamping plate near its upper end so that the pressure upon the test piece is progressively applied thereto, to the end that the test piece is not weakened by said clamping means at its point of engagement therewith. The test piece, which is designated 62, is a cord strand that extends downwardly from the free end of the rocker arm.

At their lower ends, each test piece 62 is connected to a weighted structure comprising a member 64 that is slidably mounted for vertical movement in the counter frame 30, the upper end of said member being provided with work-gripping means similar to that provided at the ends of rocker arms 56, for clamping the test piece thereto. Said means comprises a clamping plate 65 secured to member 64 by a stud and nut 66, the adjacent faces of the clamping plate and member 64 being provided with rubber facings 67, 67 to prevent crushing of the test piece and to avoid abrasion of the test piece at the edge of the clamping plate as the result of repeated tensioning and flexing. The stud and nut 66 engage the clamping plate near its lower end, relatively remote from the portion of the test piece, under test, so that graduated pressure is exerted on the latter to avoid local weakening thereof at the edge of the gripping means. Threaded into the lower end of each member 64 is a downwardly extending rod 68, and secured to the lower end of said rod is a weight 69. Adjacent rods 68 may be of different lengths as is mostly clearly shown in Fig. 5. The pan 21 is formed with apertures 70, 70 through which the rods 68 extend, the weights 69 being positioned below said pan. The members 64 are positioned against the rear face of the front wall of the counter frame 30, and said wall may be apertured at 71, 71 and the members 64 formed with bores 72, 72, as is most clearly shown in Figure 6, so that suitable pegs or pins may be inserted through said apertures 71 and into bores 72 when the apertures and bores are in alignment. The bores 72 are so positioned longitudinally of the members 64 that the latter will be in raised position when said apertures and bores are aligned, so that pins fitted therein will support said members 64 in raised position. This feature of the apparatus is utilized when test pieces are being mounted therein.

Mounted in the counter frame 30, in abutting relation to the lower face of partition 24, is a series of laterally abutting guide blocks 75, 75, each of which carries a bearing 76 for the cam shaft 50. Each guide block 75 is laterally recessed in one side and formed with longitudinally extending slideways for a slide or brake 77, the latter being rectangular in shape and formed with a relatively large transverse aperture 78 through which the cam shaft 50 extends. The slide 77 also is formed interiorly with a slot or recess 79, Figures 6 and 7, that extends from aperture 78 to the rear end of the slide, and suitably journaled in said recess is a cam roller 80, the periphery of which extends into aperture 78. Mounted upon cam shaft 50, within aperture 78 of the slide 77, is a cam 81 having a single outwardly projecting cam-lug 81a adapted to strike cam roller 80 during each revolution of cam shaft 50, with the result that slide 77 is moved rearwardly. Mounted between the rear end of each slide 77 and the rear wall of counter frame 30 is a compression spring 82 adapted normally to urge slide 77 forwardly, and the front end of slide 77 is covered with friction material 83, such as brake lining, which material engages the rear face of a member 64.

The arrangement is such that slide 77 normally acts as a brake upon member 64 to hold the latter stationary as cam 53 raises and lowers rocker arm 56 and thereby periodically tensions and slackens test piece 62. Periodically the slide 77 is retracted, against the pressure of spring 82, to release member 64 and thereby to permit its static weight 69 to come into operation to remove slack from the test piece by moving member 64 downwardly, this operation occurring during an interval when the rocker arm 56 is resting upon the elevated portion of cam 53, as subsequently will be explained. Since cam shaft 50 rotates only at one-fourth the speed of cam shaft 44, the slack in the test piece is taken up only during every fourth cycle of operation of said cam 53.

The relative strength of the test pieces 62 is determined by the number of flexings and tensionings they undergo before failing, wherefore suitable counting mechanism is associated with each testing unit of the apparatus. Said counting mechanism comprises a driving shaft 85 that is suitably journaled in the counter frame 30, and at one end is provided with a gear 86, Figure 5, that is meshed with a pinion 87 that is fixed to the hub of gear 49 on the cam shaft 50. The ratio of pinion 87 to gear 86 is 2½ to 1, and since the ratio of cam shaft 44 to cam shaft 50 is 4 to 1 it will be seen that the cam shaft 44 will make 10 revolutions to each revolution of shaft 85.

At spaced points along shaft 85, corresponding to the respective testing units of the apparatus, are mounted bevel gears 89, 89, which gears mesh with respective bevel gears 90, 90 that are mounted upon one end of respective shafts 91, 91. The latter are journaled for limited axial movement in suitable bearings formed in the counter frame 30, and extend beyond the front wall of the latter, at right angles to shaft 85. Each shaft 91 normally is urged rearwardly by a compression spring 92 that is mounted upon said shaft between a collar 93 thereon and the front wall of counter frame 30, the rearward movement of the shaft being limited by a disc 94 mounted upon the front end thereof. In the rearward position of the shaft 91 the gear 90 thereon is in mesh with a gear 89 on shaft 85. Along its lower margin the front wall of the counter frame 30 is formed with a forwardly extending bracket portion 95 upon which is mounted a series of counting devices 96, 96. The operating shaft of each counting device 96 is provided with a forked arm 97 that straddles a stud 98 that is eccentrically mounted upon the adjacent disc 94 of a shaft 91, and which projects laterally therefrom in an axial direction. The arrangement permits axial movement of shaft 91 relatively of counting device 96 while they are in operative engagement with each other. It will be sen that the total number of revolutions recorded by the counting device will be exactly one-tenth of the number of revolutions of cam shaft 44.

It is desirable, when a test piece 62 fails, that the rocker arm 56 to which said test piece is attached be lifted off the rotating cam 53, and that the counting device 96 be disengaged so that no more revolutions of cam shaft 44 are counted thereon. To this end a plurality of vertically disposed push rods 100, 100 are slidably mounted in suitable guideways in the guide blocks 75 and the webs 52, the lower end of each push rod 100 being disposed below counter frame 30 and connected thereat to one end of a lever 101 that is pivotally mounted upon a rod 102 carried by said counter frame. Said lever 101 extends forwardly to a point beyond and below the bracket 95, and is provided thereat with a hand-grip portion 103. In the region of the fulcrum 102 of lever 101, the latter is formed with an upwardly-extending forked arm 104 that straddles shaft 91 and bears against the rear side of collar 93 thereon, and is adapted, upon occasion, to move said collar and shaft forwardly to disengage bevel gears 89, 90 that are associated with said shaft. The push rod 100 normally is urged upwardly by a compression spring 105 that is mounted thereon between a collar 106, fixed to the push rod, and the top face of partition 24. The push rod 100 normally is retained in lowered position, against the pressure of spring 105, by latching mechanism presently to be described, and in said lowered position the upper end of the push rod is in spaced relation to a boss 56a formed on a laterally projecting portion of rocker arm 56, which boss the push rod will engage in its movement upward, to lift said rocker arm off cam 53. The arrangement provides a certain amount of lost motion between push rod and rocker arm to limit the height to which the rocker arm is raised.

Each push rod 100 is retained in depressed position, against the pressure of its spring 105, by means of a latch 108 that is engageable with a complementally shaped notch or recess 109 formed in the push rod. The latch 108 is mounted upon a short, upwardly projecting arm of an L-shaped lever 110 that is pivotally mounted at its elbow upon a rod 111 that is carried by the counter frame 30. The other arm of lever 110 normally extends substantially horizontally toward the front of the apparatus, its forward end portion being laterally offset, as shown in Figure 5, and formed with an aperture through which a rod 68, that is connected to member 64, freely passes. The arrangement is such that the push rods 100 normally are in the position shown in Figure 2 during the operation of the apparatus. Upon the failure of a test piece 62, the succeeding rearward movement of the corresponding slide 77 releases member 64 and its weight 69 causes it rapidly to drop, thereby causing its lower end to strike the adjacent end of a lever 110 and to tilt the latter angularly as shown in Figure 3. This withdraws latch 108 from notch 109 in push rod 100, and spring 105 moves the latter upwardly to lift rocker arm 56 off cam 53, and also to tilt lever 101 angularly so that arm 104 thereof pushes shaft 91 forwardly to disengage bevel gears 89, 90 and thereby to disconnect counting device 96. Angular movement of the lever 110 under the impetus of member 64 as described is limited by one of the bearing structures for the shaft 91, which structure said lever strikes at the limit of its unlatching movement, as shown in Figure 3.

Each lever 110 normally is maintained in the latching position shown in Figure 2 by a tension spring 113 that is connected at one end to the medial region of the horizontal arm of said lever, and at its other end is connected to the free end of a lever arm 114. The respective lever arms 114 are mounted upon a rock shaft 115 that is journaled at two or more points in the counter frame 30, one end of said rock shaft extending through the adjacent end walls of main frame 22 being provided thereat with an operating handle 116. The latter normally is in the angular position that maintains the lever arms 114 and levers 110 in the operative position shown in Figure 2. Said handle may, upon occasion, be turned so as to move the lever arms 114 downwardly and thus concurrently to trip all the levers 110 whereby all of the push rods 100 are caused to move upwardly to lift all the rocker arms 56 from the cams 53. A keeper member 117 pivotally mounted upon the front margin of main frame 22 is provided for holding the handle 116 in the alternative positions mentioned.

In order to provide accurate simulations of the conditions that obtain within a tire during use, it is necessary to conduct the testing of the cord strands under determinate uniform temperature. To this end a plurality of electrically operated heating elements 120, 120 are mounted in the chamber of the housing that is disposed between the vertical partition 25 and the rear cover 27 thereof. Air to be heated enters said chamber through the slots 26 at the bottom of partition 25, and is withdrawn from the chamber at the top thereof through ducts 121, 121 that extend through top cover 23 and communicate with said chamber at opposite ends thereof. Baffle plates 122, 122 are mounted in the heating chamber to provide such a circulation and intermingling of the air therein as to assure that air withdrawn from the chamber will be of uniform temperature.

The ducts 121 extend to the intake side of respective blowers 124 that are mounted upon the top of the housing, said blowers being driven by an electric motor (not shown) that is mounted in a casing 125 between said blowers. Delivery ducts 126, 126 extend from the delivery side of the respective blowers 124 to the front of the housing where they extend through the top cover 23 thereof immediately back of the glass panes 32, at opposite ends of the test chamber in the housing. Suitable automatically operating mechanism is provided for regulating the heating elements 120 so as to maintain a determinate temperature within the testing chamber, said mechanism comprising a bimetal thermoregulator 127 mounted centrally within said testing chamber, and electrically operated switch mechanism (not shown) in a suitable cabinet 128 mounted atop of the motor casing 125. Manually operable switches 129, 129ª, Figure 1, may be provided for activating the respective upper and lower groups of heating elements 120.

The apparatus is adapted, in the testing of cord strands, closely to simulate the actual conditions that obtain in pneumatic tires of various sizes and inflations, under normal load, and running at various speeds. Certain of the conditions that obtain in a running tire are accentuated in the testing apparatus so as to reduce the time required for making the test. For example, the abnormal strain imposed upon tire cords when they rebound after being flexed by contact of the tire with the roadway is greatly accentuated in the testing apparatus. Furthermore, the duration of the phase of abnormal condition in each test cycle is a greater proportion of the total test cycle time than the duration of the phase of abnormal condition in the tire bears to the total time required for the tire to make one revolution.

For the purpose of illustrating how the conditions that obtain in a tire are simulated in the apparatus, a pneumatic tire is diagrammatically shown in Figure 12, which tire has a four-ply carcass and is of the size known as "6.00–16". As shown the tire is inflated to 28 lbs. air pressure, is under a normal load of 915 lbs., and is assumed to be rotating in the direction indicated by the arrow at the rate of 35 M. P. H. At the rate of speed noted, the tire will make one revolution in .12 second. At the inflation mentioned there is a tensile strain on each cord strand of the carcass of substantially 1 pound, and each is elongated about 3%.

That portion of the tire that is in contact with the ground is flattened so that this region of the tire is more or less elliptical in transverse section, the long axis of the ellipse being axially disposed. In the region of maximum flatness, indicated by the letter B in the drawing, the tensile strain on the cords of the tire is substantially zero. The circumferential extremities of said flattened region are indicated by the letters A and C, said region being about 30° in length.

Rearwardly of the flattened region A—C the tire is bulged radially outwardly in a relatively short region extending from C to E on the drawings, which bulge gives the tire a slightly elliptical contour with the long axis of the ellipse disposed radially of the tire. The said bulge in the tire is caused by the rebound or reaction of the tire structure when the deforming pressure present in the flattened region A—C is removed, the cords of the tire carcass snapping into the bulge and thereby being momentarily subjected to greater than normal tension. It is estimated that the tension on the cord strands in the bulge C—E is at least one and one-third pounds per strand. The magnitude of the bulge C—E depends upon three factors; namely, the air pressure within the tire, the resilience and elasticity of the rubber structure of the tire, and the centrifugal force set up by the rotation of the tire.

Since it is extremely difficult to measure the extent of the bulge in a rotating tire, the dimension of the same as shown in the drawing is only approximate. In the testing apparatus the cord strands are subjected to strains comparable to those that they undergo in a rotating tire that is inflated and loaded as set forth, which strains are produced primarily by the particular profile of the cam 53.

As is most clearly shown in Figures 8 to 10, the peripheral surface of the cam 53 is divided into a plurality of regions, the limits of which are designated by the letters A' to G' inclusive. The cam is formed with a concentric arcuate surface extending from A' to C' in the direction of the arrow, said surface consisting of about 240° of the entire peripheral surface of the cam. Between C' and A' the cam is formed with a flat chordal cam surface that intersects the aforesaid arcuate surface at a sharp angle at C' and is rounded or curved at its juncture with the aforesaid arcuate surface at A'.

In the operation of the cam 53, the cam roller 57 of rocker arm 56 rests thereon, and the cam rotates in the direction indicated by the arrows in Figures 8 to 10. When the cam is rotated at 420 R. P. M., the test cord 62 is subjected to testing strains at the same frequency as comparable strains occur in the tire shown in Figure 12 when running at 35 M. P. H. When the cam 53 is in the position shown in Figure 8, the test piece 62 is taut, and under a tension of about one pound by reason of the static weight of member 64 and the rod 68 and weight 69 suspended therefrom. By reason of the aforesaid tension, the cord has an elongation of about 3%.

As shown in Figure 8, the cam roller 57 is resting upon that region of cam surface C'—A' that is defined by letters F'—G. It is in this position of the cam that slide 77 periodically is retracted (every fourth revolution of the cam) to release its normal engagement with member 64 for the purpose of causing the latter to take up slack in the test piece and thus assuring that the normal tension of one pound will be maintained. The figure shows slide 77 in the position it occupies when retracted by the cam 81. The condition of the test piece 62 in this figure is comparable to the condition of the cords in the region extending from E to A, in the direction of the arrow, of the tire shown in Figure 12, and may be considered the normal condition of the cords in the tire.

In Figure 9 the slide 77 is shown in frictional engagement with member 64, thus holding the latter stationary. The cam roller 57 is shown resting upon the flat cam surface A'—C', with the result that the free end of rocker arm 56 is lowered and the test piece slackened to a condition of zero tension. This condition of the test piece corresponds to the condition of the cords in the tire shown in Figure 12, in the region A—C thereof that is in contact with the roadway, which cords are under sub-normal tension because of the flattened condition of the tire. The roller 57 passes onto the flattened region of the cam 53 smoothly because of the radius at the end of said flattened surface adjacent point A', and the slackened test piece 62 momentarily assumes a spiral disposition as shown, probably because of the twist of its strands.

In Figure 10 the cam roller 57 is shown as it appears after passing of the flattened surface of cam 53 at point C'. Because of its momentum, the cam roller does not immediately pass onto the adjacent arcuate surface of the cam, but is thrown radially outwardly of the latter and momentarily is in spaced relation thereto. The result is to subject the test piece to a snapping action that imparts a tension thereto that corresponds to the super-normal tension on the cord strands of an inflated tire in the bulged region thereof defined by the letters C—E in Figure 12. The super-normal tension imparted to the test piece in the apparatus is controlled by the weights 58 carried by the rocker arm 56, for the reason that the momentum of the throw of the latter is controlled by the mass of said weights. Preferably said super-normal tension is considerably greater than the corresponding strains present in the inflated tire in motion for the purpose of reducing the time required for making the test. The region in which the cam roller is removed from the cam is defined by the points C'—E' thereon, the cam roller being shown at its maximum elevation, which is opposite point D' on the cam, the latter point corresponding to point D on the tire of Figure 12.

Referring now to the graph shown in Figure 11, it will be apparent that the cycle of abnormal conditions that obtain in a rotating tire are closely simulated in the improved testing apparatus.

The normal and sub-normal tensions imposed on the test piece may be considered identical in value with similar tensions imposed on the cords in a tire. The super-normal tension imposed on the test piece is much greater than the corresponding tension imposed on the cords in the tire as will be apparent from a comparison of the relative positions of points D and D' in the graph. As shown therein, the position of point D' indicates that the test piece is subjected to a tension of 3 lbs. whereas the average super-normal pressure of cords in a tire is about 1⅓ lbs.

It will also be observed from the graph that the duration of the phase of abnormal tension (.05 sec.) is about 40% of the total duration (.12 sec.) of each test cycle, whereas the duration of the period of abnormal tension in the cords of a tire is about 11% of time required for the tire to make one revolution. This is due to the mechanical exigencies of cam design. It does not materially affect the results obtained by the apparatus since its only effect is to shorten the time that the test piece is in the normal tension phase of the operative cycle.

During the test the temperature within the apparatus automatically is maintained at 110° C., which is approximately the temperature in the carcass of a 4 ply, 6.00—16 tire running at 35 M. P. H. under average load. The apparatus tests a plurality of cords at a time, and failure of any cords has no effect on the testing of the other cords. The apparatus closely simulates the actual conditions that obtain in a tire in use and achieves the other advantages set out in the foregoing statement of objects.

Modification may be resorted to without departing from the spirit of the invention or the scope of the appended claims.

What is claimed is:

1. In testing apparatus of the character described, the combination of means engaging the respective ends of a cord strand and supporting it in vertical position, the lowermost of said cord-supporting means being of determinate weight so as to impose a determinate, normal, tensile strain on the cord, means periodically engaging said lowermost cord-supporting member to hold it fixedly in position, and means for periodically moving the uppermost cord-engaging member relatively of the lowermost cord-engaging member to subject the cord to sub-normal tensile strain followed by super-normal tensile strain during intervals when the lower cord-engaging member is fixedly held.

2. In cord testing apparatus, the combination of a rocker arm having its free end adapted to grip one end of a cord strand, a member of determinate weight suspended from the other end of the cord strand to impart determinate normal tension thereto, periodically releasable means normally holding said member stationary, and means for effecting cyclic angular movement of said rocker arm to relieve all strain and then to impose greater than normal strain upon the cord strand.

3. In cord testing apparatus, the combination of a rocker arm having its free end adapted to grip one end of a cord strand, a member of determinate weight suspended from the other end of the cord strand, clamping means periodically engaging said member to hold it fixedly in position, and means for periodically rocking said rocker arm in determinate time relation to the operation of said last mentioned means to impose tensile strains of varying degree upon the cord strands during intervals that the said member is fixedly held.

4. In cord testing apparatus, the combination of a rocker arm having its free end adapted to grip one end of a cord strand, means for fixedly retaining the opposite end of the cord strand so as to impose a normal tension upon the cord in one position of the rocker arm, and cam means engaging the rocker arm for periodically oscillating it to impose sub-normal followed by super-normal tension on the cord.

5. A combination as defined in claim 4 including means for altering the weight of the rocker arm as a means for controlling the super-normal tension applied to the cord.

6. A combination as defined in claim 4 including means for periodically taking up the slack in the cord and re-applying normal tension thereto.

7. In a cord testing apparatus, the combination of a rocker arm having its free end adapted to grip one end of a cord strand, means for fixedly retaining the other end of the cord strand, and a rotating cam engaging and oscillating said rocker arm, said cam having a major arcuate cam surface that supports the rocker arm in a position that imposes a determinate tension to the cord and a minor flat cam surface that supports the rocker arm in a position that imposes a reduced tension, the profile of the cam and its speed of rotation being such that the rocker arm, in moving from the flat cam surface, is lifted by its own momentum off the surface of the cam whereby the cord is subjected to greater tension than obtains when the rocker arm bears upon the major arcuate surface of the cam.

8. In a cord testing apparatus, the combination of a rocker arm adapted to support a cord strand at its free end, means for fixedly retaining the other end of the cord strand, a cam engaging said rocker arm for oscillating it to impose varying tensile strains on the cord strand, and means for moving the rocker arm out of engagement with the cam upon breakage of the cord strand.

9. In a cord testing apparatus, the combination of a rocker arm adapted to support a cord strand from the upper end of the latter, means for fixedly retaining the lower end of the cord strand, a cam upon which said rocker arm rests and which is adapted to oscillate the latter to impose varying tensile strains on the cord strand, a vertically movable push rod beneath the rocker arm adapted to lift the latter off the cam, and means for moving said push rod upwardly upon the breakage of the cord strand.

10. In a cord testing apparatus, the combination of a rocker arm adapted to support a cord strand by engagement with the upper end thereof, means for fixedly retaining the lower end of the cord strand, a cam upon which said rocker arm rests and which is adapted to oscillate the latter to impose varying tensile strains on the cord strand, a vertically movable push rod beneath the rocker arm adapted to lift the latter off the cam, yielding means normally urging said push rod upwardly, latching means normally retaining said push rod in lowered position, against the force of said yielding means, and means for withdrawing said latching means from the push rod to permit the latter to rise upon the breakage of a cord strand.

11. In a cord testing apparatus, the combination of a rocker arm adapted to support a cord strand from the upper end thereof, means for fixedly retaining the lower end of the cord, a rotatable cam upon which the rocker arm rests and which is adapted to oscillate the latter to impose tensile strains of different degrees upon the cord, a vertically movable push rod beneath the rocker arm adapted to lift the latter off the cam, a counter connected to the cam-rotating means for counting rotations of the cam, and means for moving said push rod upwardly and for concurrently disconnecting the counter from its driving means upon breakage of the cord.

12. In a cord testing apparatus, the combination of a rocker arm adapted to support a cord strand from the upper end thereof, means for fixedly retaining the lower end of the cord, a rotatable cam upon which the rocker arm rests and which is adapted to oscillate the latter to impose tensile strains of varying degree upon the cord, a vertically movable push rod beneath the rocker arm adapted to lift the latter off the cam, spring means normally urging said push rod upwardly, latching means normally retaining said push rod in lowered position against the force of said spring, a revolution counter, drive means therefor, yielding means for operatively connecting the counter-driving means with the cam-driving means, and means operating automatically upon the breakage of a test cord for withdrawing said latching means to cause the push rod to lift the rocker arm from the cam and for concurrently disengaging the counter-driving means from the cam-driving means against the force of said yielding means.

13. In a cord testing apparatus, the combination of a rocker arm having its free end adapted to grip one end of a cord strand, a member of determinate weight suspended from the other end of the cord strand, means for effecting cyclic oscillating movement of the rocker arm, a clamping slide engageable with said weight member, yielding means normally urging the slide toward said weight member for holding the latter stationary, and means for retracting the slide, against the force of said yielding means, in determinate time relation to the oscillation of said rocker arm.

14. In a cord testing apparatus, the combination of a rocker arm having its free end adapted to grip one end of a cord strand, a rotatable cam upon which the rocker arm rests and which is adapted to oscillate the latter, a member of determinate weight suspended from the other end of the cord strand, a clamping slide engageable with said weight member, a spring normally urging the slide against said weight member for holding the latter stationary, cam means for retracting the slide, against the force of said spring, away from the weight member, and means for rotating said cams at determinate relative speeds.

RAYMOND W. ALLEN.
THEODORE A. TE GROTENHUIS.